United States Patent [19]
Lindell

[11] Patent Number: 5,245,610
[45] Date of Patent: Sep. 14, 1993

[54] DIGITAL RADIO MOBILE FREQUENCY SUPERVISION

[75] Inventor: Karl B. Lindell, Lindingo, Sweden

[73] Assignee: Ericsson Ge Mobile Communications, Inc., Paramus, N.J.

[21] Appl. No.: 702,962

[22] Filed: May 20, 1991

[51] Int. Cl.⁵ .......................... H04J 3/16; H04B 1/00; H04B 7/00
[52] U.S. Cl. ................. 370/95.1; 370/94.1; 455/54.2; 455/71; 455/33.1
[58] Field of Search .................. 379/58, 59, 60, 63; 455/33.1, 33.2, 33.3, 33.4, 5.1, 69, 51.1, 54.1, 54.2, 56.1, 37.1, 71, 119, 53.1; 370/13, 17, 50, 95.1, 95.2

[56] References Cited

U.S. PATENT DOCUMENTS

| | | | |
|---|---|---|---|
| 4,019,138 | 4/1977 | Watanase et al. | 455/69 |
| 4,513,415 | 4/1985 | Martinez | 455/53.1 |
| 4,901,368 | 2/1990 | Arnold et al. | 455/69 |
| 4,955,082 | 9/1990 | Hattori et al. | 370/95.1 |
| 4,972,507 | 11/1990 | Lusignan | 455/53.1 |
| 5,103,445 | 4/1992 | Ostbund | 370/79 |
| 5,119,502 | 6/1992 | Kallin et al. | 455/56.1 |

Primary Examiner—Douglas W. Olms
Assistant Examiner—Ajit Patel
Attorney, Agent, or Firm—Johnson & Gibbs

[57] ABSTRACT

The frequency stability of the signals transmitted by a plurality of mobile stations to an associated base station within a radio network is supervised by first generating a reference signal at the base station. The signals received from the mobile stations are compared to the reference signal and a difference signal is generated. The difference signal is compared to first and second error values and if the difference exceeds the first error value, the mobile is summoned for a service adjustment. If the difference exceeds the second error value, the mobile is disabled from further transmissions.

26 Claims, 5 Drawing Sheets

DIGITAL RADIO MOBILE FREQUENCY SUPERVISION

CROSS REFERENCE TO RELATED APPLICATION

This application contains subject matter related to copending U.S. patent application Ser. No. 07/604,141, entitled "Digital Radio Frequency Compensation", which was filed Oct. 26, 1990, and which is assigned to the assignee of the present invention. Such application and the disclosure therein is hereby incorporated by reference herein.

BACKGROUND OF THE INVENTION

1. Field of the Invention

The invention relates to mobile radio frequency supervision and, more particularly, mobile radio frequency drift supervision in a digital radio network.

2. History of the Prior Art

A fundamental concept underlying radio communications systems is that transmission and reception must occur at specific operating frequencies and that such frequencies must be stable over a period of time. Most systems achieve frequency stability by including a crystal oscillator which generates a very precise frequency which is then used to produce the various high frequency signals employed in the different components of the radio. Crystals are, however, subject to variations in their resonant frequency of oscillation due to various environmental conditions. Although various techniques are used to stabilize the frequency of oscillation of a crystal control oscillator, it may vary substantially and be unable to be compensated for due to failure of various components within the frequency compensation circuitry, poor design in the compensation circuitry, and for other reasons.

A mobile radio network may consist of a plurality of different systems, operated by different operators, each of which is made up of base stations and mobiles, many of which may be operating on the same relatively narrow frequency channels. In the event one of the mobile radios experiences transmitter frequency stability problems, it may begin transmitting on a different frequency from that which is intended and interfere with or totally block other transmissions on that channel. The location and identification of such offending mobile radio transmitters causing a disruption of communications within the radio network may be very difficult. Further, it is highly desirable to be able to detect such frequency instability in a mobile before communications in the overall network are disturbed or interrupted and summon the mobile station to a service center for adjustment of its transmitter frequency and/or promptly disable the transmitter of the mobile if it is already interfering substantially with the remainder of the communications traffic in the network.

In addition, there may be other reasons for seeking to disable a mobile from operation on the network. For example, in the event a subscriber fails to make timely payment of its bill for the mobile radio service, it may be desirable to disable the network from providing continued service to the mobile and force it to seek some explanation or correction of the disablement of the mobile at the network service center.

In digital packet radio communication systems, there are often a plurality of different systems working simultaneously on the same frequency channel within the radio network. Thus, the network must be careful to insure that the signal which is being transmitted by each mobile is within the frequency channels assigned to it by the network. Radio frequency interference and other spurious electrical signals will disrupt the communications channels to some extend and a mobile station with poor frequency stabilization makes broadcasting on the random channels even more difficult.

One resolution of this problem is to monitor the stability of the frequency of the signal broadcast by each of the mobiles in a network and disable and/or report a mobile who is sufficiently off frequency to cause communications difficulties in the network. When a base station attempts to measure the frequency being transmitted by a mobile and then disable the mobile in the event the frequency stabilization is not within the minimum accepted standards for the network, it must insure that only that particular mobile is disabled by the network. The base station must be careful not to mistake the signal of one mobile for another before it takes the drastic action of disabling the offending mobile.

Another aspect of digital packet radio systems which makes it difficult to use the signal transmitted from the mobile to measure the frequency and identify the mobile is that the data signals from the mobile are broadcast in burst mode. That is, the transmissions are all very short bursts of RF energy followed by the absence of RF signals in the spacing between bursts. This means that the base station must be capable of making a frequency measurement of the signal transmitted by the mobile very quickly. It must also measure the true mean frequency of the transmitter signal regardless of the digital information with which the carrier signal is modulated.

The system of the present invention overcomes these and other disadvantages of prior systems and enables the base station of a digital packet radio system to periodically measure the frequency of the signal being transmitted from each of the mobile stations and use that signal to determine whether or not the frequency standard being used by the mobile requires adjustment. In the event that the signal being broadcast is sufficiently erroneous that it may cause problems within the network, the base station may also notify the network control center to call the mobile into a service center for adjustment of its oscillator. Alternately, the network control center may disable the mobile from further transmitting operations. Monitoring and control of mobile frequency stability by the base stations of the network ensures that both the transmitting circuitry and the receiving circuitry of each mobile station is properly frequency stabilized against each of the potential variables which could cause the reference oscillator to be operating at less than a high degree of frequency stability and/or causing actual transmission difficulty within the network.

SUMMARY OF THE INVENTION

In one aspect the invention includes a method and system for supervising the frequency stability of signals transmitted by a plurality of mobile stations which broadcast to an associated base station within a mobile radio system network. A control center for supervision of the network is connected to each of the base stations. A signal is transmitted from each of the mobile stations to an associated base station and each of the transmissions includes information which identifies the particular mobile station broadcasting the signal. A base station receives a signal transmitted from an associated mobile station. A reference signal having a frequency related to the desired frequency of transmission of the mobile station from which a signal was received is generated in the base station. The frequency of the signal received from the associated mobile is compared to the reference signal and a signal is generated which is indicative of the difference between the compared signals. The difference signal is compared to a first error value which is indicative of a first degree of difference between the frequency of the reference signal and the frequency of the transmission received from the associated mobile. The identity of the associated mobile is reported to the network control center for summoning the mobile for a service adjustment in response to the difference exceeding the first error value.

In another aspect of the invention the difference signal is compared to a second error value greater than the first error value which is indicative of a second degree of difference between the frequency of the reference signal and the frequency of the transmission received from the associated mobile. The identity of the associated mobile is reported which disables further transmissions by the mobile in response to the difference exceeding the second error value.

BRIEF DESCRIPTIONS OF THE DRAWINGS

For an understanding of the present invention for further objects and advantages thereof, reference may now be had to the following description taken in conjunction with the accompanying drawing, in which.

DETAILED DESCRIPTION

Various embodiments of the system of the present invention will be described as implemented in a particular digital packet cellular mobile communications systems of a type which the relevant literature designates a "slotted ALOHA" system. Although the radio with which the present invention is exemplified is intended to handle only data communications, such systems are capable of handling both packet data as well as speech communication and comprises some features which are not essential to the system of the present invention. Accordingly, the invention is not restricted to this particular system but may be implemented in various different systems.

Figure 1:
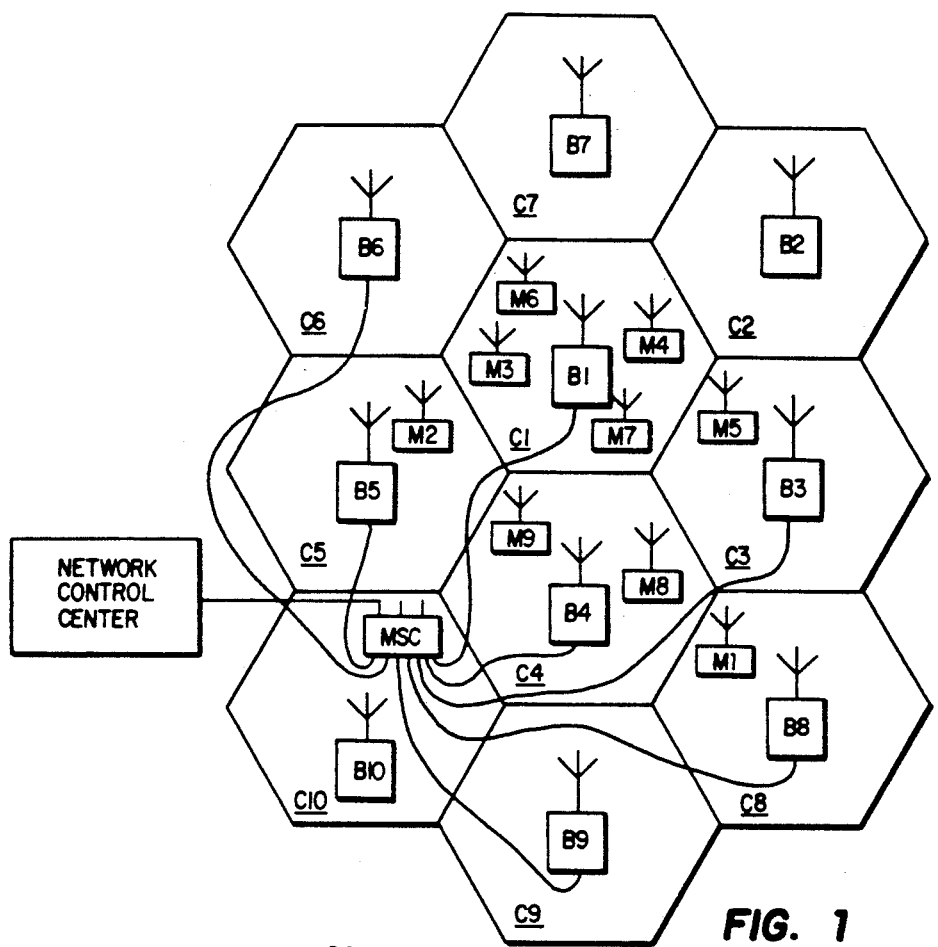
FIG. 1 is an illustrative diagram of a cellular mobile radio system in which the system of the present invention may be utilized.

Referring first to FIG 1, there is illustrated a digital cellular radio system including mobile station radios which implements the frequency supervision system of the present invention. FIG. 1 illustrates ten cells C1–C10, each of which includes a base station B1–B10, respectively. FIG. 1 also illustrates ten mobile stations M1–M10 which are moveable within a cell and from one cell to another cell within the system. Also illustrated in FIG. 1 is a mobile switching center (MSC) which is connected to all ten of the illustrated base stations (B1–B10) by means of electrical connections such as the cable shown and to other MSCs in the network. The MSC is also connected to the network control center 40 along with all the other MSCs of all the other systems forming part of the network. The mobile switching center may also be connected to a fixed public switching telephone or data network or similar fixed private network (not shown).

Although the mobile system illustrated in FIG. comprises at least one duplex radio channel and preferably a plurality of duplex radio channels for communication between the various base stations and the mobiles, it should be understood that the system of the invention may also be implemented in a one-frequency simplex system or a two-frequency "semi-duplex" system. While some advantages may be achieved when two or more base stations share a radio channel, according to prevailing traffic load, it will first be assumed, for the purpose of making the system of the invention easier to understand, that each base station has its own duplex radio channel (pair of simplex radio channels) or its own allotted time on a duplex radio channel (pair of simplex radio channels) for communication with mobile stations served by that base station.

Although two or more base stations may cooperate in certain procedures, e.g., handoff or roaming, it will, for the purpose of explaining the present invention, be sufficient to consider only the communication between one base station, e.g , B1, and one of the mobile stations served by that particular base station, e g., M3, M4, M6 and M7.

Figure 2:
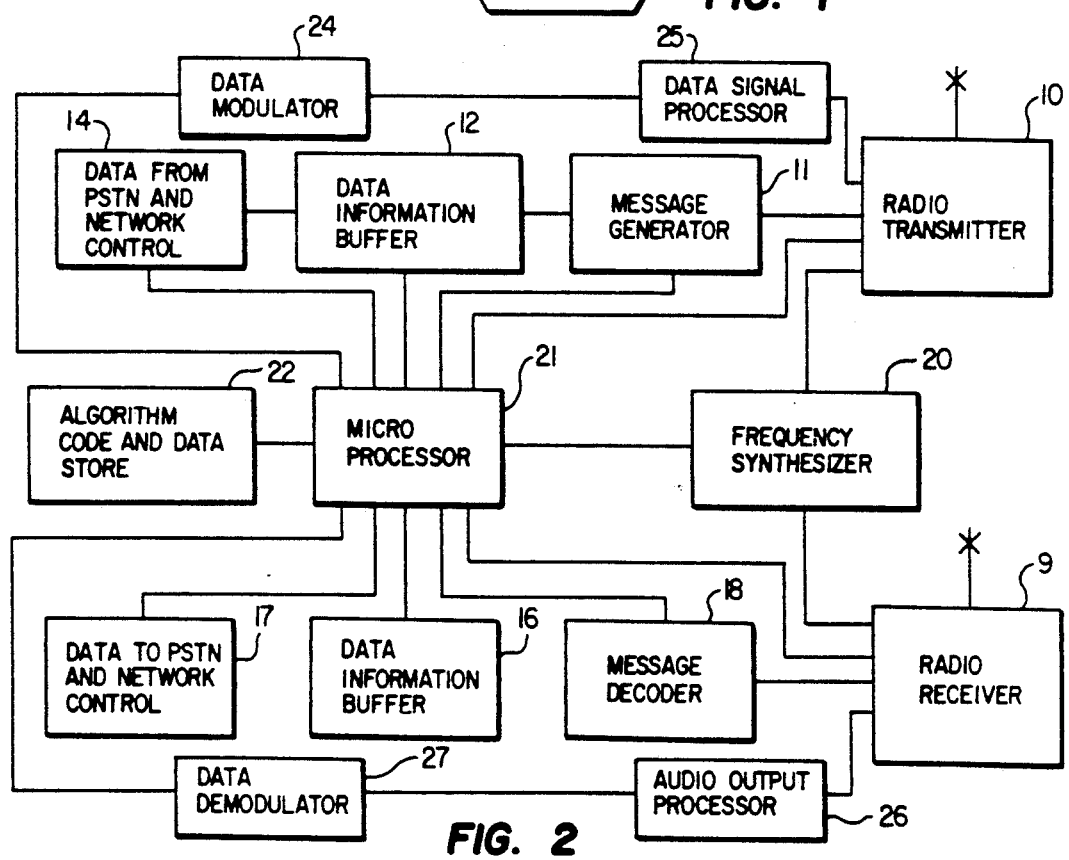
FIG. 2 is a block diagram for a base station within a digital packet cellular radio system.
Figure 3:
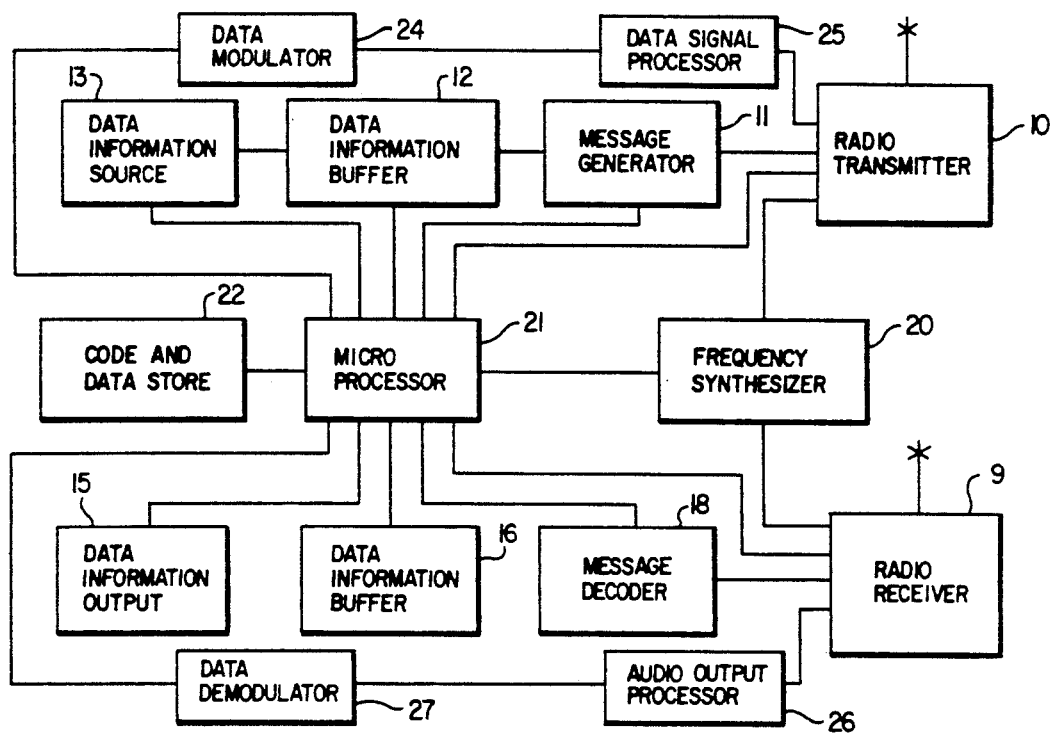
FIG. 3 is a block diagram of a mobile station within a digital packet cellular radio system.

FIG. 2 illustrates a block diagram of a mobile station within the system of FIG 1 and FIG. 3 illustrates a block diagram of a base station within FIG. 1, each for possible use in connection with the system of the present invention. The base and mobile stations are designed for full duplex digital message communications in time slots of a radio channel that may be shared by plural mobile stations within plural mobile systems of a network. Although a base station normally comprises means for enabling it to simultaneously communicate on more than one radio channel only means for communications on one radio channel is illustrated in FIG. 3.

Both base and mobile stations comprise a microprocessor control led radio receiver. Referring to both FIGS. 2 and 3, the radio transmitter 10 transmits radio signals modulated with digital messages generated by a message generator 11. In the mobile station of FIG. 3, the message generator is connected to a data information source 12, e.g., a keyboard, via a data information buffer 13. The information to be transmitted in both the mobile and the base stations is processed by means of a data modulator 24 and a data signal processor 25. In the base station of FIG. 2, the message generator and data information buffer 13 is connected to a data line terminal 14 receiving data from a data network to which the data terminal is connected by circuits such as fixed telephone lines. In the mobile station, the message decoder 18 is connected to a data information output means 15, e.g., the display, via data information buffer 16. In the base station, the message decoder 18 is instead connected via data information buffer 16 to a data line terminal 17 supplying data to a data network control center to which the data terminal is connected by circuits such as fixed telephone lines. Transmitted information received by the receiver 9 of both the base and the mobile stations is processed by an audio output processor 26 and a data demodulator 27 while information to be broadcast by the transmitter 10 of both the base and mobile station is processed by a data modulator 24 and a data signal processor 25. The radio channel on which the radio transmitters 10 and receivers 9 of both the mobile and base stations operate is determined by frequencies supplied from a frequency synthesizer 20 controlled by the micro-processor 21. Finally, the base and mobile stations both include means 22 for storing algorithms, codes, rules, formats, data and compensation values.

Figure 4A:
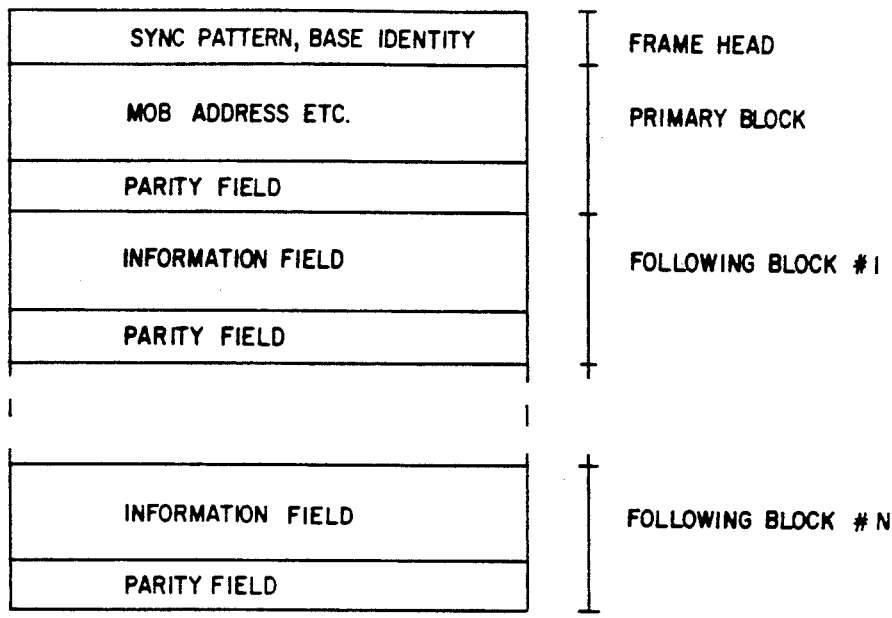
FIG. 4 is a diagram illustrating the overall signaling protocol of the digital packet radio system in which the present invention is used.
FIG. 4B is a diagram illustrating the signaling protocol within the frame head of a signal transmitted by a mobile station of a digital packet radio system in which the system of the present invention is employed.
FIG. 4C is a diagram illustrating the signaling protocol within the primary block of a signal transmitted by a mobile station of a digital packet radio system in which the system of the present invention is employed.
Figure 4B:
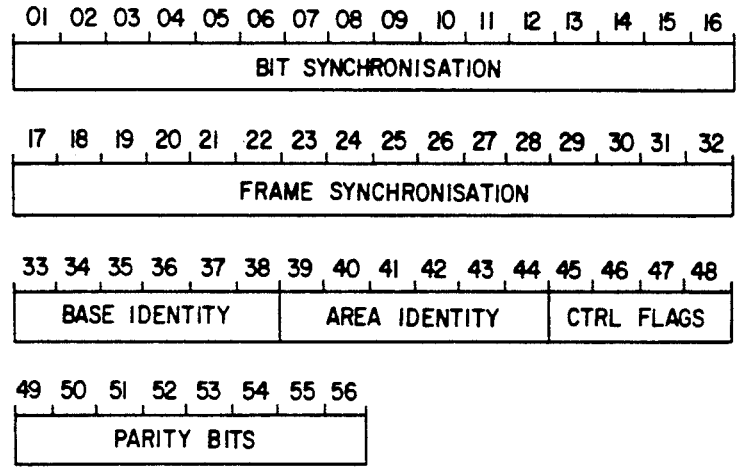
Figure 4C:
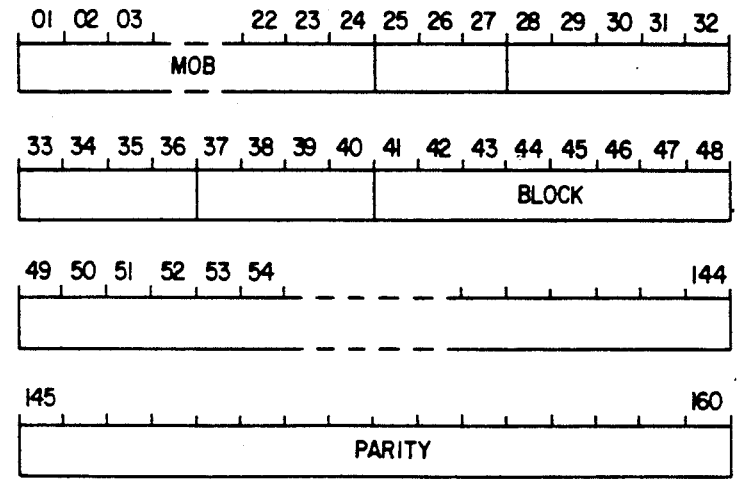

The digital packet radio system of the present invention maintains its communications in accordance with a prescribed signaling protocol which includes a logical structure of data controlling the communication between each base station and the mobile stations. In particular, and as is illustrated in the diagram of FIG. 4A, each burst of transmitted information between a base station and a mobile includes a framehead 31 which is followed by other control information and data, a primary block 32 and additional data blocks 33, each of which includes a parity field 34 for error detection and correction. The protocol format of each framehead and each primary block for each transmitted packet is the same. FIG. 4B illustrates the arrangement of the data comprising the framehead showing that bits 1-16 comprise the bit synchronization block 30, bits 17-32 comprise the frame synchronization block 35, while bits 33-38, 39-44, and 45-48 comprise the base identity 36, area identity 37, and control flag blocks 38, respectively, and bits 49-56 comprise parity bits 39 used in the error detection and correction system of the radio. The bit synchronization block 30 always includes the same pattern of ones and zeros which enables an accurate measurement of the transmitted frequency as will be further discussed below. In addition, the base identity and area identity blocks 36 and 37 together identify the particular base station. The remainder of the frame of digital information transmitted over the radio channel following the framehead is the primary block 32 which includes the mobile station address along with other information and a parity field 34. Thereafter, the following blocks 33 comprise a sequence of blocks of information which include an information field and a parity field 34 which are broadcast until the required information has been transmitted. FIG. 4C illustrates the arrangement of data comprising the primary block 32 showing that bits 1-24 comprise the address identifying the mobile station which is transmitting the data, in the case of a packet intended for reception by the base station, or the address of the mobile station for which the packet is intended, in the case of a broadcast by the base station. Bits 25-27, bits 28-32, bits 33-36, and bits 37-40, are each used for various purposes within the system. Bits 41-48 specify the number of blocks in the frame, including the primary blocks, bits 49-144 are used for various purposes, and bits 145-160 are parity bits for error detection and correction. It should be noted that because of the use of interleaving and parity and checksum in the format of the transmitted data packets, a complete primary block must be received, deinterleaved and checked for errors before the mobile station identification field (MOB) can be read out by the primary block for use by the base station. In the case of a packet broadcast by a mobile station to the base station, the MOB data is used to identify the particular mobile station so that upon receipt, the base station can be sure of which signal is being received from which particular mobile station of the system prior to the use of the measured frequency of the signal as will be described below.

As discussed above, the mobile stations within the system of the present invention operate within an environment in which radio channels are shared within a network between more than one operators. Thus, it is essential that a base station which is to measure and evaluate the frequency stability of a signal transmitted from a mobile station be sure of the identity of that mobile before it records its evaluation or takes action with regard an unacceptable duration in frequency. In addition, the transmitters of the stations comprising the present system operate in burst mode and, as a result, a base station has only a very short time period in which to take measurements of the signal transmitted from a mobile station.

Because the shared channels in the present radio system are relatively narrow, i.e., only on the order of 12.5 $KH_z$ in width, and operate with a relatively high data rate, on the order of 8K bits/second, the system requires a high degree of frequency stability within both its transmitter and its receiver. The mobile stations within the system operate within a frequency stability standard of about ±1.5 PPM (±1.35 $KH_z$ at 900 $MH_z$). For this reason, there must be a high level of stability within the reference oscillators of the radio circuits.

Figure 5:
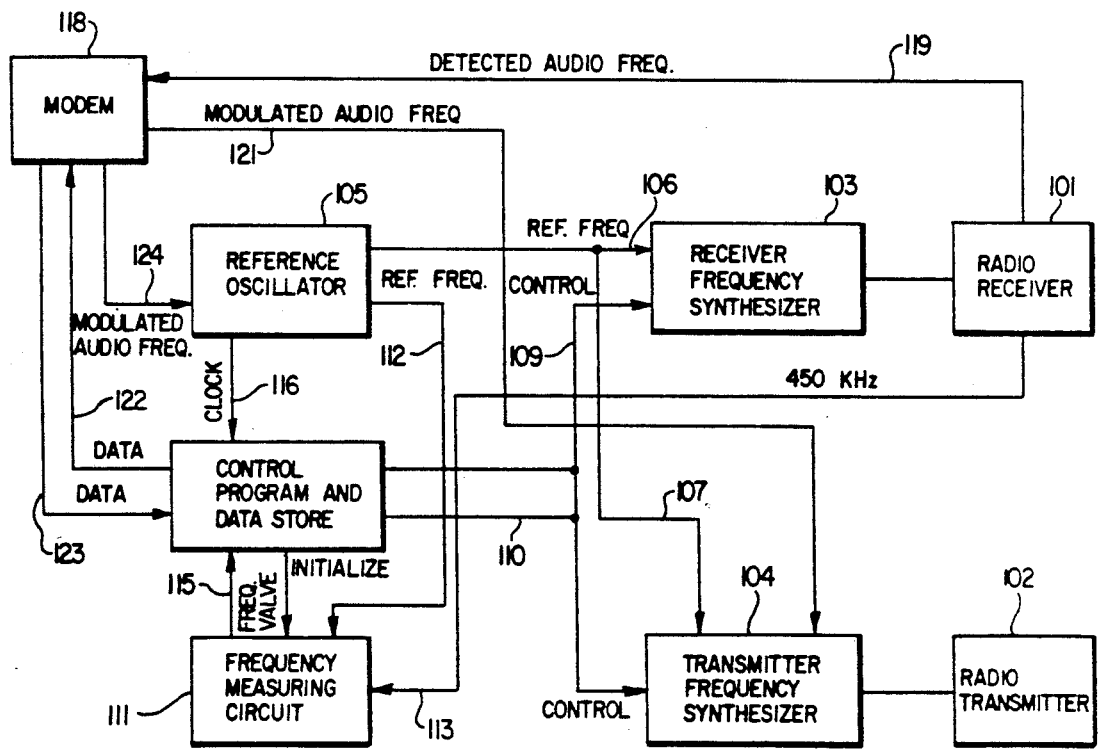
FIG. 5 is a block diagram of a frequency measurement system used in the present invention.

Referring now to FIG. 5, there is shown a block diagram of a mobile radio station frequency measurement circuit used in a frequency supervision system constructed in accordance with the teachings of the present invention. A radio receiver 101 and a radio transmitter 102 are each connected, respectively, to a receiver frequency synthesizer 103 and a transmitter frequency synthesizer 104, each of which operate in accordance with standard phase locked loop frequency synthesization circuitry. Both the receiver frequency synthesizer 103 and the transmitter frequency synthesizer 104 receive a reference frequency from a reference oscillator 105 which includes a reference crystal the resonant frequency of which is used as the base station frequency standard in accordance with the system of the present invention. The reference frequency is connected to the receiver frequency synthesizer 103 via line 106 and to the transmitter frequency synthesizer 104 via line 107. The receiver frequency synthesizer 103 and transmitter frequency synthesizer 104 are operated under control of a control, program and data store module 108, which includes a microprocessor and a memory, and is connected to the two synthesizers 103 and 104 by means of control lines 109 and 110, respectively. A frequency measuring circuit receives a reference frequency from the reference oscillator 105 via line 112 and a signal to be measured is received from the transmitter of the mobile station (not shown) by the radio receiver 101 and which is connected to the frequency measuring circuit 111 via line 113. In the present system, the received mobile station transmitter signal is used in the form of a second IF frequency of 450 KH$_z$. The control, program and data store module 108 is connected to the frequency measuring circuit 111 to provide an initialization signal on line 114 and to receive a measured frequency value on line 115. The module 108 is also connected to the reference oscillator 105 to receive a clock signal, derived from the reference frequency signal, on line 116.

A modem 118 receives a detected audio frequency from the radio receiver 101 via line 119 and provides a modulated audio frequency signal to the transmitter frequency synthesizer 104 via line 121. The modem 118 receives data from the control, program and data store module 108 via line 122 and sends data to the module 108 via line 123. The modem also provides a modulated audio frequency signal to the reference oscillator 105 on line 124 and to the transmitter frequency synthesizer 104 on line 121.

In general, the frequency measurement circuitry of FIG. 5 functions as follows. The carrier signal broadcast from the mobile station, having a carrier frequency on the order of 900 MH$_z$, is received by the base station radio receiver 101 and reduced by series of mixers to an IF signal having a valve of approximately 450 KH$_z$. The 450 KH$_z$ signal is used to provide a gating signal of approximately one milli-second in duration during which time the cycles of the reference frequency on line 112 from the reference oscillator 105 are counted in a counter. The number of cycles of this signal counted during the one milli-second time period is used as the value from which there is determined the degree to which the frequency of the mobile station deviates from the frequency of the standard reference oscillator of the base station 105. The deviation value is compared with stored tolerable error values in the control, program and data store module 108 and a decision made as to what action should be taken. If the frequency deviation value is within the required tolerance for acceptable deviation of the mobile, no action is taken other than recording the value and the time for record purposes. If the deviation is greater than a first value of allowable frequency deviation, then the identity of the mobile and the degree of deviation is reported to the network control center which can then call the mobile in to a service center for adjustment of its oscillator to correct the deviation. If the measured deviation is greater than both the first value and a second value of tolerable frequency deviation, then not only is the identity of the mobile and the degree of frequency deviation reported to the network control center but the center then provides control signals back to the base station to cause it to send a disable signal to the mobile. Such a disable signal causes the transmitter of the mobile to become dysfunctional so that the off frequency signal is no longer broadcast into the network to provide interfering RF signals on the other channels of the network.

The network control center can stop further transmissions from a mobile in at least two ways: (1) the mobile switching center can stop any outgoing data packets from or incoming data packets to a mobile that is not allowed to work in the network (e.g., due to a frequency error, unpaid bills, or other reason); and (2) the network can send a disable message to a mobile and its system software responds by blocking any further transmissions from the mobile.

Figure 6:
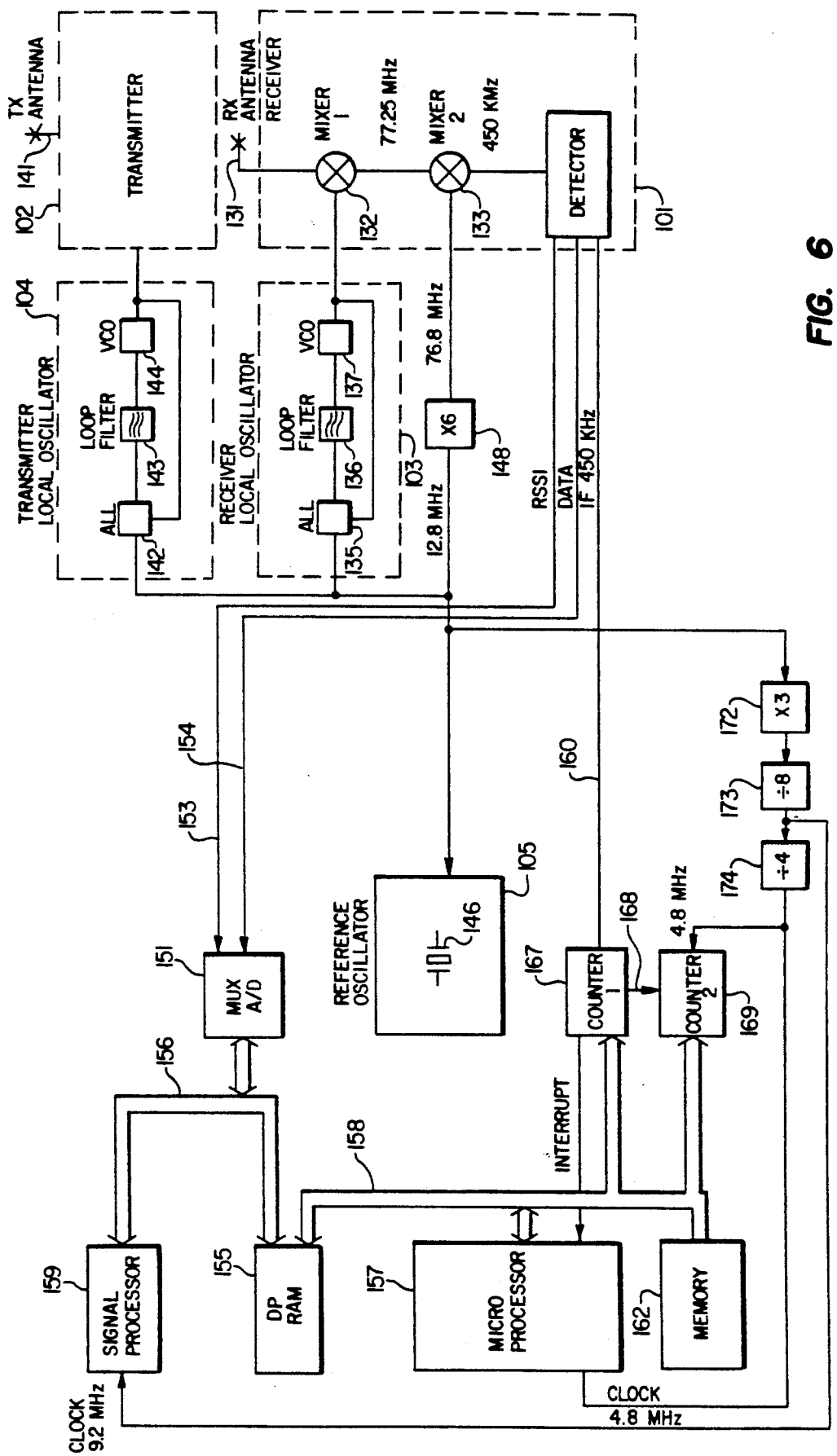
FIG. 6 is a schematic diagram of its frequency measurement system shown in FIG. 5.

Referring next to FIG. 6, there is shown a detailed block diagram of a frequency measurement circuit which may be used in the system of the present invention. The receiver 101 includes a receiving antenna 131, a first mixer 132, a second mixer 133 and a detector 134. The receiver's frequency synthesizer 103 includes a conventional receiver local oscillator circuit comprising a phase looked-loop circuit 135, a loop filter 136 and a voltage control oscillator 137. Similarly, the transmitter 102 includes a transmitting antenna 141 and the transmitter frequency synthesizer 104 includes a relatively standard transmitter local oscillator circuit comprising a phase locked-loop circuit 142, a loop filter 143 and a voltage control oscillator 144. Both the receiver local oscillator 103 and the transmitter local oscillator 104 receive a reference frequency signal from the reference oscillator 105 which includes the reference crystal 146, the frequency of which is being used as the standard in the system of the present invention. The 12.8 MH$_z$ reference frequency output signal of the reference oscillator is connected to the receiver frequency synthesizer 102, the transmitter frequency synthesizer 104 and the second mixer 133 of the receiver 101 through a times 6 frequency multiplier 148. The received signal strength signal (RSSI) is connected from the detector 134 in the receiver 101 to a multiplexing analog-to-digital converter on line 153 and data is connected from the detector 134 on line 154. The output of the multiplexing A/D converter 151 is connected to a dual-port RAM memory 155 through a bus structure 156 and from there to the control micro-processor 157 through its bus structure 158.

A signal processor 159, which serves primarily as a modem, is connected to both the double-port RAM 155 and a D/A converter 161 via the bus structure 156. A memory 162 is coupled to the micro-processor and other components via the bus structure 158.

A first counter 167 receives a 450 KH$_z$ IF signal from the detector 134 within the receiver 101 and provides a gating signal over line 168 to a second counter 169. The counter 167 provides an interrupt signal on line 171 to the micro-processor 157. Both the first and second counters 167 and 169 receive inputs on the microprocessor bus structure 158. The reference frequency, 12.8 MH$_z$ from the reference oscillator 145, is connected through a times 3 multiplier circuit 172, a divide by 8 divider circuit 173 and a divide by 4 divider circuit 174 to produce a 4.8 MH$_z$ signal to one input of the second counter 169. The 4.8 MH$_z$ output signal from the divide by 4 divider 174 is connected to the microprocessor 157 as a 4.8 MH$_z$ clock signal while the output of the divide by 8 divider circuit 173 is connected to provide a 19.2 MH$_z$ clock signal to the signal processor 159.

Functionally, the signal processor 159 serves as a modem to generate modulation within the radio transmitter and to receive and detect transmitted data received from the detector 134 via the line 154 and the multiplexing analog converter 151. The DP RAM 155 is a double-port RAM memory which is used as temporary storage for communication between the signal processor 159 and the micro-processor 157. The microprocessor 157 controls the radio and runs the various algorithms which perform calculations and control functions within the radio. The memory 162 includes both ROM and RAM types of memory and stores the various data tables used in frequency measurement in accordance with the system of the present invention. The multiplexing A/D converter 151 receives the various analog signals and multiplexes them into the bus structure 156. The signals include the receive signal strength indicator (RSSI) signals from detector 134 and audio frequency data on line 154 from detector 134. The multiplexer 151 converts the audio signals to digital and then multiplexes the data from each of the two inputs into the data bus 156 for communication with the DP RAM 155 and the micro-processor 157.

If the frequency of the signal received from the mobile is within the general range expected, the first counter 167 gives a nominal one milli-second output pulse via line 168 to the second counter 169. Counter 169 counts the number of cycles of the 4.8 MH$_z$ reference oscillator signal which occur during the approximately one milli-second gating pulses received from the first counter. This is then used as a measure of the frequency of the carrier signal received from the mobile station by the receiver 101. This frequency deviation value from the standard established by the base station reference oscillator 105 is used to obtain the value by which the transmitter of the mobile is off frequency. The dividers/multipliers 172, 173 and 174 process the reference frequency signal from the reference oscillator 105 to give a 4.8 MH$_z$ signal which goes both to the microprocessor 157 as a clock and to the second counter 169 as a representation of the reference frequency signal.

In the base station receiver 101, the signal received from the mobile station on antenna 131 is combined in the first mixer 132 with the signal from local oscillator 103 to produce a 75.25 MH$_z$ signal which is introduced to the second mixer 133 along with a 76.8 MH$_z$ signal, obtained from the reference oscillator by a times 6 multiplication circuit 148, to produce an output signal of 450 KH$_z$ to the detector 134. The 450 KH$_z$ IF signal on line 160 is connected to the input of the first counter 167 which counts 900 cycles and provides gating signals with a nominal one milli-second separation between them. The output of the reference oscillator 105, a 12.8 MH$_z$ reference frequency signal, is multiplied and divided in circuits 172, 173 and 174 to produce a 4.8 MH$_z$ signal as an input to the second counter 169. For every 900 cycles of the 450 KH$_z$ signal input into the first counter 167, it produces an output pulse on line 167 to the second counter 169. Thus, the signal output from the first counter 167 to the second counter 169 on line 168 is a square-wave pulse having a nominal one milli-second period. If the transmitting frequency of the mobile station is precisely correct, i.e., produces a one milli-second output signal on line 168, the second counter 169 will count 4,800 pulses from the 4.8 MH$_z$ reference value signal during the one milli-second period. The value actually counted by the second counter 169 is sent to the micro-processor 157 and the memory 162 via the bus structure 158. The microprocessor 157 then determines the degree of deviation of the frequency of the transmitted signal received from the mobile from the frequency of the reference oscillator 105. The degree of deviation is then compared by the microprocessor 157 with allowable values of deviation stored in memory 162. The outcome of these comparisons determine whether the value is simply stored for reference, reported to the network control center for obtaining subsequent adjustment of the mobile's oscillator frequency or reported to the network control center for disablement of the mobile's transmitter due to interference in the network by continued operation of the mobile.

Figure 7:
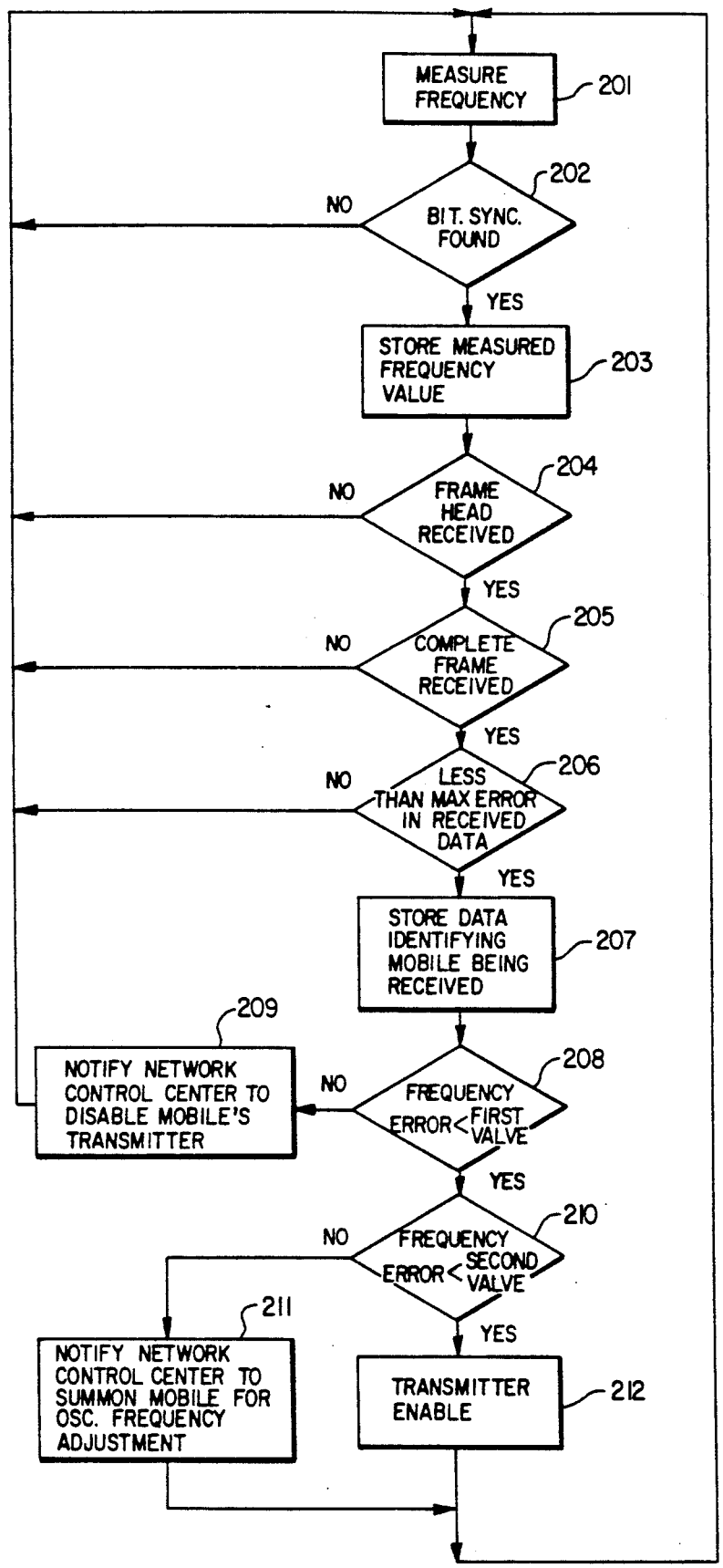
FIG. 7 is a flow chart illustrating the operation of the frequency stability supervision system of the present invention.

Referring now to FIG. 7, there is shown a flow chart indicating the program routine used by the system of the present invention to make the necessary measurements and provide frequency supervision within the system. At 201, the system measures a frequency value, as described above in connection with FIG. 6, during the approximate one milli-second burst of RF energy transmitted from the mobile station in the burst mode operation. The simplest way to ensure true zero mean value error is to make the frequency measurements over a period during which the mean value of the modulation deviation is zero, such as when a bit synchronization pattern is being transmitted. Thus, the present system makes the frequency measurement during the time when it is receiving the bit synchronization block portion of the framehead transmitted by the mobile to insure that the received frequency is evaluated only during the consistent pattern of ones and zeros comprising each bit synchronization block. Since the pattern of data with which the transmitted signal is modulated effects the nominal frequency of the transmitted signal this consistent pattern of transmitted information insures greater accuracy within the measurements. However, it should be noted that any period of a transmission burst can be used to measure frequency if correction is made for the mean value error of that particular whole packet (or part of it). The mean value can be determined after demodulation of the bit pattern. It is also possible to use the whole packet (or part of it) without correction for mean value error, if this error is always sufficiently small. Such a result can be achieved by coding of the packet.

At 202, the system determines whether or not the bit synchronization block was found within the signal which was measured. If not, the system recycles to 201 to measure again and if so, it moves to 203 to store the measured frequency value in memory. Next, at 204, the system determines whether the entire framehead and primary blocks of the transmitted burst has been received from the mobile station. The primary block of the transmitted data block contains the mobile station identity data which identifies the particular mobile station transmitting the information. Once the system determines at 204 that a framehead and primary block have been received, it determines at 205 whether a complete frame has been received. The entire frame includes a parity field of data which enables the system to determine whether or not there are any data errors occurring in the transmission and to deinterleave the transmitted data to determine the mobile identity information. This insures that any data corrections necessary will be made in the received information before decisions are made. That is, at 206 the system determines whether there is less than the maximum error in the received data so that the received data can be used to ascertain whether the correct base station has been received. If the data is determined to be of sufficient accuracy at 206, the system determines and stores at 207 the identity of the mobile station from which the signal measured at 201 was received.

If the system has determined after moving through steps 201-207 that a complete frame of sufficient accuracy to ascertain the identity of the mobile from which the signal was received, the system moves to 208 where it determines whether or not the frequency difference error between the frequency measured from the mobile at 201 and the reference frequency within the reference oscillator of the base station is less than an absolute maximum allowable error value referred to above as a "second error value." At a nominal carrier frequency of 900 $MH_z$ the maximum error value might typically be on the order of 5 $KH_z$. If the error was greater than the maximum allowable then the identity of the mobile and the frequency deviation are reported to the network control center and the frequency supervision system automatically disables the transmitter of the mobile unit at 209 and prevents any additional transmission of signal from it. This prevents transmission of signals by a mobile station which would be out of its assigned frequency channel and cause serious problems within both the radio system and the network. If the frequency error was within the absolute allowable range, the system moves to 210 where it determines whether or not the error was less than the maximum operating error allowable without correction, referred to above as a "first error value." If not, the transmitter identity of the mobile and the degree of frequency deviation is reported to the network control center. At a nominal carrier frequency of 900 $MH_z$ the maximum operating error might typically be on the order of 1.5 $KH_z$. Any deviation greater than that amount requires that the mobile be summoned by the network control to a service center so that the oscillator of the mobile transmitter can be adjusted to bring it into conformance with the standard.

As can be seen from the above description of the method and system of the present invention, an extremely high degree of frequency stability is obtained from the mobiles comprising the network by quickly requiring that any radios which deviate from the standard be adjusted and/or disabled if the deviation is sufficiently large to cause network problems. This enables a high degree of stability of all mobiles operating within a narrow band, high data rate receiver/transmitter system with a relatively modest amount of cost.

While it is believed that the operation and construction of the system of the present invention will be apparent from the foregoing description, the method of operation system shown and described and has been characterized as being preferred and obvious changes and modifications may be made therein without departing from the spirit and scope of the invention as defined in the following claims.

What is claimed is:

1. A method for supervising a plurality of mobile stations which broadcast to an associated base station within a mobile radio system network to detect mobile stations of said plurality of mobile stations which transmit signals at other than desired frequency, said method comprising:

transmitting a signal from each of said mobile stations to an associated base station, each of said transmitted signals including information which identifies a particular mobile station broadcasting the signal;

receiving at a base station a signal from an associated mobile station;

generating in said base station a reference signal having a frequency related to the desired frequency of transmission of the mobile station from which a signal was received;

comparing the frequency of the signal received from the associated mobile station to said reference signal;

generating a difference signal indicative of the difference between the compared signals;

comparing said difference signal to a first preselected threshold error value indicative of a first degree of difference between the frequency of said reference signal and the frequency of the transmission received from said associated mobile station; and identifying said mobile station as needing a mobile station service adjustment in response to said difference exceeding said first preselected threshold error value.

2. A method for supervising the frequency stability of signals transmitted by a plurality of mobile stations which broadcast to an associated base station within a mobile radio system network as set forth in claim 1, which also includes:

determining from the signal received by the base station from said associated mobile station the identity of said mobile station.

3. A method for supervising the frequency stability of signals transmitted by a plurality of mobile stations which broadcast to an associated base station within a mobile radio system network as set forth in claim 1, in which:

each of said signals transmitted from said mobile stations to an associated base station are broadcast in burst mode.

4. A method for supervising the frequency stability of signals transmitted by a plurality of mobile stations which broadcast to an associated base station within a mobile radio system network as set forth in claim 3 wherein said mobile radio system network is a packet data network and which also includes the steps of:

determining when a complete data frame has been received within the burst of data transmitted from said mobile station;

determining whether the received data contains more than a preselected number of data errors before performing said comparing the frequency step.

5. A method for supervising the frequency stability of signals transmitted by a plurality of mobile stations which broadcast to an associated base station within a mobile radio system network as set forth in claim 3 wherein said mobile radio system network is a packet data and in which said burst of data transmitted by said mobile station is formatted in accordance with a protocol which includes:

a bit synchronization block having a fixed configuration of data;

a frame head including a base station identity block;

a primary block including a mobile station identity field; and a parity field which includes information for error detection and correction.

6. A method for supervising the frequency stability of signals transmitted by a plurality of mobile stations which broadcast to an associated base station within a mobile radio system network as set forth in claim 5 wherein said mobile radio system network is a packet data and in which said comparing step includes:

comparing the frequency of the signal received from said associated mobile station during the portion of the burst containing the bit synchronization block.

7. A method for supervising the frequency stability of signals transmitted by a plurality of mobile stations which broadcast to an associated base station within a mobile radio system network as set forth in claim 1, in which said means for comparing the frequency of the signal received from the associated mobile station to said reference signal includes:

means for deriving an intermediate frequency signal from the signal received from said associated mobile station prior to comparing.

8. A method for supervising a plurality of mobile stations which broadcast to an associated base station within a mobile radio system network to detect mobile stations of said plurality of mobile stations which transmit signals at other than desired frequency, said method comprising:
- transmitting a signal from each of said mobile stations to an associated base station, each of said transmitted signals including information which identifies a particular mobile station broadcasting the signal;
- receiving at a base station a signal from an associated mobile station;
- generating in said base station a reference signal having a frequency related to the desired frequency of transmission of the mobile station from which a signal was received;
- comparing the frequency of the signal received from the associated mobile station to said reference signal;
- generating a difference signal indicative of the difference between the compared signals;
- comparing said difference signal to a first preselected threshold error value indicative of a first degree of difference between the frequency of said reference signal and the frequency of the transmission received from said associated mobile station;
- identifying said mobile station as needing a mobile station service adjustment in response to said difference exceeding said first preselected threshold error value;
- comparing said difference signal to a second preselected threshold error value greater than said first error value and indicative of a second degree of difference between the frequency of said reference signal and the frequency of the transmission received from said associated mobile station; and
- disabling further transmissions by said mobile station in response to said second degree of difference exceeding said second preselected threshold error value.

9. A method for supervising a plurality of mobile stations which broadcast to an associated base station within a mobile radio system network to detect mobile stations of said plurality of mobile stations which transmit signals at other than desired frequency, said method comprising:
- transmitting a signal from each of said mobile stations to an associated base station, each of said transmitted signals including information which identifies a particular mobile station broadcasting the signal;
- receiving at a base station a signal from an associated mobile station;
- generating in said base station a reference signal having a frequency related to the desired frequency of transmission of the mobile station from which a signal was received;
- comparing the frequency of the signal received from the associated mobile station to said reference signal by counting a preselected number of cycles of a signal derived from the signal received from the mobile station and generating a periodic gating signal, counting the number of cycles of a signal derived from the reference signal which occur between successive gating signals and comparing the number of cycles counted with a value related to the frequency received from said mobile station;
- generating a difference signal indicative of the difference between the compared signals;
- comparing said difference signal to a first preselected threshold error value indicative of a first degree of difference between the frequency of said reference signal and the frequency of the transmission received from said associated mobile station; and
- identifying said mobile station as needing a mobile station service adjustment in response to said first degree of difference exceeding said first preselected threshold error value.

10. A method for supervising a plurality of mobile stations which broadcast in burst mode to an associated base station within a mobile radio system network to detect mobile stations of said plurality of mobile stations which transmit signals at other than desired frequency, said mobile radio system network being a packet data network, said method comprising:
- transmitting a signal from each of said mobile stations to an associated base station, each of said transmitted signals including information which identifies a particular mobile station broadcasting the signal;
- receiving at a base station a signal broadcast from an associated mobile station;
- generating in said base station a reference signal broadcast having a frequency related to the desired frequency of transmission of the mobile station from which a signal was received;
- comparing the frequency of the signal received from the associated mobile station to said reference signal during a period in which the mean value of the modulation deviation is zero;
- generating a difference signal indicative of the difference between the compared signals;
- comparing said difference signal to a first preselected threshold error value indicative of a first degree of difference between the frequency of said reference signal and the frequency of the transmission received from said associated mobile station; and
- identifying said mobile station as needing a mobile station service adjustment in response to said first degree of difference exceeding said first preselected threshold error value.

11. A method for supervising a plurality of mobile stations which broadcast in burst mode to an associated base station within a mobile radio system network to detect mobile stations of said plurality of mobile stations which transmit signals at other than desired frequency, said mobile radio system network being a packet data network, said method comprising:
- transmitting a signal from each of said mobile stations to an associated base station, each of said transmitted signals including information which identifies a particular mobile station broadcasting the signal;
- receiving at a base station a signal from an associated mobile station;
- generating in said base station a reference signal having a frequency related to the desired frequency of transmission of the mobile station from which a signal was received;
- demodulating at least part of a data packet;
- determining a mean value of said demodulated data packet;
- correction for the mean value error of said data packet;

comparing the frequency of the signal received from the associated mobile station to said reference signal;

generating a difference signal indicative of the difference between the compared signals;

comparing said difference signal to a first preselected threshold error value indicative of a first degree of difference between the frequency of said reference signal and the frequency of the transmission received from said associated mobile station; and identifying said mobile station as needing a mobile station service adjustment in response to said first degree of difference exceeding said first preselected threshold error value.

12. A method for supervising a plurality of mobile stations which broadcast in burst mode to an associated base station within a mobile radio system network to detect mobile stations of said plurality of mobile stations which transmit signals at other than desired frequency, said mobile radio system network being a packet data network, said method comprising:

transmitting a signal from each of said mobile stations to an associated base station, each of said transmitted signals including information which identifies a particular mobile station broadcasting the signal;

receiving at a base station a signal broadcast from an associated mobile station;

generating in said base station a reference signal having a frequency related to the desired frequency of transmission of the mobile station from which a signal was received;

coding the data packets to reduce a mean value error therein;

comparing the frequency of the signal received from the associated mobile station to said reference signal using at least part of the whole data packet without correction for mean value error;

generating a difference signal indicative of the difference between the compared signals;

comparing said difference signal to a first preselected threshold error value indicative of a first degree of difference between the frequency of said reference signal and the frequency of the transmission received from said associated mobile station; and identifying said mobile station as needing a mobile station service adjustment in response to said first degree of difference exceeding said first preselected threshold error value.

13. A method for supervising a plurality of mobile stations which broadcast in burst mode to an associated base station within a mobile radio system network to detect mobile stations of said plurality of mobile stations which transmit signals at other than desired frequency, said mobile radio system network being a packet data network, said method comprising:

transmitting a signal from each of said mobile stations to an associated base station, each of said transmitted signals including information which identifies a particular mobile station broadcasting the signal;

receiving at a base station a signal from an associated mobile station;

generating in said base station a reference signal having a frequency related to the desired frequency of transmission of the mobile station from which a signal was received;

comparing the frequency of the signal received from the associated mobile station to said reference signal;

generating a difference signal indicative of the difference between the compared signals;

comparing said difference signal to a first preselected threshold error value indicative of a first degree of difference between the frequency of said reference signal and the frequency of the transmission received from said associated mobile station;

identifying, including by recognizing the mobile station identity field within a primary block of the data burst, said mobile station as needing a mobile station service adjustment in response to said first degree of difference exceeding said first preselected threshold error value; and determining the signal received by the base station from said associated mobile station the identity of said mobile station.

14. A method for supervising a plurality of mobile stations which broadcast to an associated base station within a mobile radio system network having a control center connected to each of the base stations to detect mobile stations of said plurality of mobile stations which transmit signals at other than desired frequency, said method comprising:

transmitting a signal from each of said mobile stations to an associated base station, each of said transmitted signals including information which identifies a particular mobile station broadcasting the signal;

receiving at a base station a signal from an associated mobile station;

generating in said base station a reference signal having a frequency related to the desired frequency of transmission of the mobile station from which a signal was received;

deriving an intermediate frequency signal from the signal received from said associated mobile station;

comparing the frequency of the signal received from the associated mobile station to said reference signal;

generating a difference signal indicative of the difference between the compared signals;

comparing said difference signal to a first preselected threshold error value indicative of a first degree of difference between the frequency of said reference signal and the frequency of the transmission received from said associated mobile station; and identifying said mobile station as needing a mobile station service adjustment in response to said first degree of difference exceeding said first preselected threshold error value.

15. A system for supervising a plurality of mobile stations which broadcast to an associated base station within a mobile radio system network to detect mobile stations of said plurality of mobile stations which transmit signals at other than desired frequency, said system comprising:

means for transmitting a signal from each of said mobile stations to an associated base station, each of said transmitted signals including information which identifies a particular mobile station broadcasting the signal;

means for receiving at a base station a signal from an associated mobile station;

means for generating in said base station a reference signal having a frequency related to the desired frequency of transmission of the mobile station from which a signal was received;

means for comparing the frequency of the signal received from the associated mobile station to said reference signal;

means for generating a difference signal indicative of the difference between the compared signals;

means for comparing said difference signal to a first preselected threshold error value indicative of a first degree of difference between the frequency of said reference signal and the frequency of the transmission received from said associated mobile station; and means for identifying said mobile station as needing a mobile station service adjustment in response to said first degree of difference exceeding said first preselected threshold error value.

16. A system for supervising the frequency stability of signals transmitted by a plurality of mobile stations which broadcast to an associated base station within a mobile radio system network as set forth in claim 15, which also includes:

means for determining from the signal received by the base station from said associated mobile station the identity of said mobile station.

17. A system for supervising the frequency stability of signals transmitted by a plurality of mobile stations which broadcast to an associated base station within a mobile radio system network as set forth in claim 16 wherein said mobile radio system network is a packet data network and in which said means for determining the identity of said mobile station includes:

means for recognizing the mobile station identity field within the primary block of the data burst.

18. A system for supervising the frequency stability of signals transmitted by a plurality of mobile stations which broadcast to an associated base station within a mobile radio system network as set forth in claim 15, in which:

each of said signals transmitted from said mobile stations to an associated base station are broadcast in burst mode.

19. A system for supervising the frequency stability of signals transmitted by a plurality of mobile stations which broadcast to an associated base station within a mobile radio system network as set forth in claim 18 wherein said mobile radio system network is a packet data network and in which said burst of data transmitted by said mobile station is formatted in accordance with a protocol which includes:

a bit synchronization block having a fixed configuration of data;

a frame head including a base station identity block;

a primary block including a mobile station identity field; and a parity field which includes information for error detection and correction.

20. A system for supervising the frequency stability of signals transmitted by a plurality of mobile stations which broadcast to an associated base station within a mobile radio system network having a control center connected to each of the base stations as set forth in claim 18 wherein said mobile radio system network is a packet data network and which also includes:

means for determining when a complete data frame has been received within the burst of data transmitted from said mobile station; and means for determining whether the received data contains more than a preselected number of data errors before performing said comparing the frequency step.

21. A system for supervising the frequency stability of signals transmitted by a plurality of mobile stations which broadcast to an associated base station within a mobile radio system network as set forth in claim 18 wherein said mobile radio system network is a packet data network in which said means for comparing includes means for comparing during a period in which the mean value of the modulation deviation is zero.

22. A system for supervising a plurality of mobile stations which broadcast to an associated base station within a mobile radio system network to detect mobile stations of said plurality of mobile stations which transmit signals at other than desired frequency, said system comprising:

means for transmitting a signal from each of said mobile stations to an associated base station, each of said transmitted signals including information which identifies a particular mobile station broadcasting the signal;

means for receiving at a base station a signal from an associated mobile station;

means for generating in said base station a reference signal having a frequency related to the desired frequency of transmission of the mobile station from which a signal was received;

means for comparing the frequency of the signal received from the associated mobile station to said reference signal;

means for generating a difference signal indicative of the difference between the compared signals;

means for comparing said difference signal to a first preselected threshold error value indicative of a first degree of difference between the frequency of said reference signal and the frequency of the transmission received from said associated mobile station;

means for identifying said mobile station as needing a mobile station service adjustment in response to said first degree of difference exceeding said first preselected threshold error value;

means for comparing said difference signal to a second preselected threshold error value greater than said first preselected threshold error value and indicative of a second degree of difference between the frequency of said reference signal and the frequency of the transmission received from said associated mobile station; and means for disabling further transmission by said mobile station in response to said second degree of difference exceeding said second preselected threshold error value.

23. A system for supervising a plurality of mobile stations which broadcast to an associated base station within a mobile radio system network to detect mobile stations of said plurality of mobile stations which transmit signals at other than desired frequency, said system comprising:

means for transmitting a signal from each of said mobile stations to an associated base station, each of said transmitted signals including information which identifies a particular mobile station broadcasting the signal;

means for receiving at a base station a signal from an associated mobile station;

means for generating in said base station a reference signal having a frequency related to the desired frequency of transmission of the mobile station from which a signal was received;

means for comparing the frequency of the signal received from the associated mobile station to said reference signal, including by means for counting a preselected number of cycles of a signal derived from the signal received from the mobile station and generating a periodic gating signal, means for counting the number of cycles of a signal derived from the reference signal which occur between successive gating signals, and means for comparing the number of cycles counted with a value related to the frequency received from said mobile station;

means for generating a difference signal indicative of the difference between the compared signals;

means for comparing said difference signal to a first preselected threshold error value indicative of a first degree of difference between the frequency of said reference signal and the frequency of the transmission received from said associated mobile station; and means for identifying said mobile station as needing a mobile station service adjustment in response to said first degree of difference exceeding said first preselected threshold error value.

24. A system for supervising the frequency stability of signals transmitted by a plurality of mobile stations which broadcast to an associated base station within a mobile radio system network as set forth in claim 23 wherein said mobile radio system network is a packet data network and in which said comparing means includes:

means for comparing the frequency of the signal received from said associated mobile station during the portion of the burst containing the bit synchronization block.

25. A method for supervising a plurality of mobile stations which broadcast in burst mode to an associated base station within a mobile radio system network to detect mobile stations of said plurality of mobile stations which transmit signals at other than desired frequency, said mobile radio system network being a packet data network, said system comprising:

means for transmitting a signal from each of said mobile stations to an associated base station, each of said transmitted signals including information which identifies a particular mobile station broadcasting the signal;

means for receiving at a base station a signal from an associated mobile station;

means for generating in said base station a reference signal having a frequency related to the desired frequency of transmission of the mobile station from which a signal was received;

means for demodulating at least part of a data packet;

means for determining a mean value of said demodulated data packet;

means for correcting for the mean value error of said data packet;

means for comparing the frequency of the signal received from the associated mobile station to said reference signal;

means for generating a difference signal indicative of the difference between the compared signals;

means for comparing said difference signal to a first preselected threshold error value indicative of a first degree of difference between the frequency of said reference signal and the frequency of the transmission received from said associated mobile station; and means for identifying said mobile station as needing a mobile station service adjustment in response to said first degree of difference exceeding said first preselected threshold error value.

26. A method for supervising a plurality of mobile stations which broadcast in burst mode to an associated base station within a mobile radio system network, to detect mobile stations of said plurality of mobile stations which transmit signals at other than desired frequency, said mobile radio system network being a packet data network said system comprising:

means for transmitting a signal from each of said mobile stations to an associated base station, each of said transmitted signals including information which identifies a particular mobile station broadcasting the signal;

means for receiving at a base station a signal from an associated mobile station;

means for generating in said base station a reference signal having a frequency related to the desired frequency of transmission of the mobile station from which a signal was received;

means for coding the data packets to reduce the mean value error therein;

means for using at least part of the whole data packet without correction for mean value error;

means for comparing the frequency of the signal received from the associated mobile station to said reference signal;

means for generating a difference signal indicative of the difference between the compared signals;

means for comparing said difference signal to a first preselected threshold error value indicative of a first degree of difference between the frequency of said reference signal and the frequency of the transmission received from said associated mobile station; and means for identifying said mobile station as needing a mobile station service adjustment in response to said first degree of difference exceeding said first preselected threshold error value.

* * * * *

UNITED STATES PATENT AND TRADEMARK OFFICE
CERTIFICATE OF CORRECTION

PATENT NO. : 5,245,610
DATED : Sep. 14, 1993
INVENTOR(S) : Karl B. Lindell

It is certified that error appears in the above-indentified patent and that said Letters Patent is hereby corrected as shown below:

Column 4, line 43  Replace "e.g ,"
With --e.g.,--

Column 4, line 44  Replace "e g.,"
With --e.g.,--

Column 8, line 8  Replace "looked-loop"
With --locked-loop--

Column 12, line 43  After first occurrence of "data"
Insert --network--

Column 12, line 58  After "data"
Insert --network--

Column 14, line 67  Replace "correction"
With --correcting--

Column 15, line 26  After "signal"
Delete --broadcast--

Column 15, line 50  After "broadcast"
Delete --in burst mode--

Column 16, line 14  After "determining"
Insert --from--

UNITED STATES PATENT AND TRADEMARK OFFICE
CERTIFICATE OF CORRECTION

PATENT NO. : 5,245,610

DATED : Sep. 14, 1993

INVENTOR(S) : Karl B. Lindell

It is certified that error appears in the above-indentified patent and that said Letters Patent is hereby corrected as shown below:

Column 18, line 50     Replace "transmission"
                           With --transmissions--

Signed and Sealed this

Twenty-fifth Day of June, 1996

Attest:

Attesting Officer

BRUCE LEHMAN

*Commissioner of Patents and Trademarks*